(12) United States Patent
Goodman

(10) Patent No.: US 8,739,944 B1
(45) Date of Patent: Jun. 3, 2014

(54) ELECTRONIC PARKING BRAKE ACTUATOR

(76) Inventor: Larry Goodman, Cerritos, CA (US)

(*) Notice: Subject to any disclaimer, the term of this patent is extended or adjusted under 35 U.S.C. 154(b) by 151 days.

(21) Appl. No.: 13/469,473

(22) Filed: May 11, 2012

Related U.S. Application Data

(60) Provisional application No. 61/485,920, filed on May 13, 2011.

(51) Int. Cl.
*F16D 65/28* (2006.01)
(52) U.S. Cl.
USPC ......... 188/156; 188/162; 303/20; 303/122.05
(58) Field of Classification Search
USPC .............. 188/156, 157, 158, 162, 171, 173, 188/1.11 E, 2 D; 303/3, 20, 15, 122.04, 303/122.05, 191, 192
See application file for complete search history.

(56) References Cited

U.S. PATENT DOCUMENTS

| | | | |
|---|---|---|---|
| 5,180,038 A | 1/1993 | Arnold et al. | |
| 5,413,197 A * | 5/1995 | Baer et al. | 188/353 |
| 5,793,007 A * | 8/1998 | Matsumoto | 200/61.87 |
| 6,213,259 B1 * | 4/2001 | Hanson et al. | 188/156 |
| 6,406,102 B1 | 6/2002 | Arnold | |
| 6,685,281 B2 * | 2/2004 | MacGregor et al. | 303/123 |
| 6,702,405 B1 | 3/2004 | Balz et al. | |
| 7,231,994 B2 * | 6/2007 | Buglione et al. | 180/65.31 |
| D677,624 S * | 3/2013 | Goodman | D13/112 |
| 2007/0029876 A1 * | 2/2007 | Makishima et al. | 303/191 |
| 2009/0247364 A1 * | 10/2009 | Sano et al. | 477/197 |
| 2009/0314590 A1 * | 12/2009 | Dagh et al. | 188/110 |

* cited by examiner

*Primary Examiner* — Pamela Rodriguez
(74) *Attorney, Agent, or Firm* — Kenneth L. Green

(57) ABSTRACT

An electrically actuated parking brake system includes a control switch in a vehicles cabin, an intelligent controller, a linear actuator, and cables connected between the linear actuator and mechanical parking brakes. The intelligent controller receives signals from the control switch and from one or more electrical device in the vehicle. If any of the signals from the vehicle indicate that the vehicle is in motion, the parking brakes are not actuated. The electrically actuated parking brake system may further include a remote control, and logic in the intelligent controller will allow the parking brakes to be engaged when the vehicle is in motion, remote control is enabled, and the remote control is actuated by a user. The parking brakes may be either drum brakes or disk brakes.

18 Claims, 6 Drawing Sheets

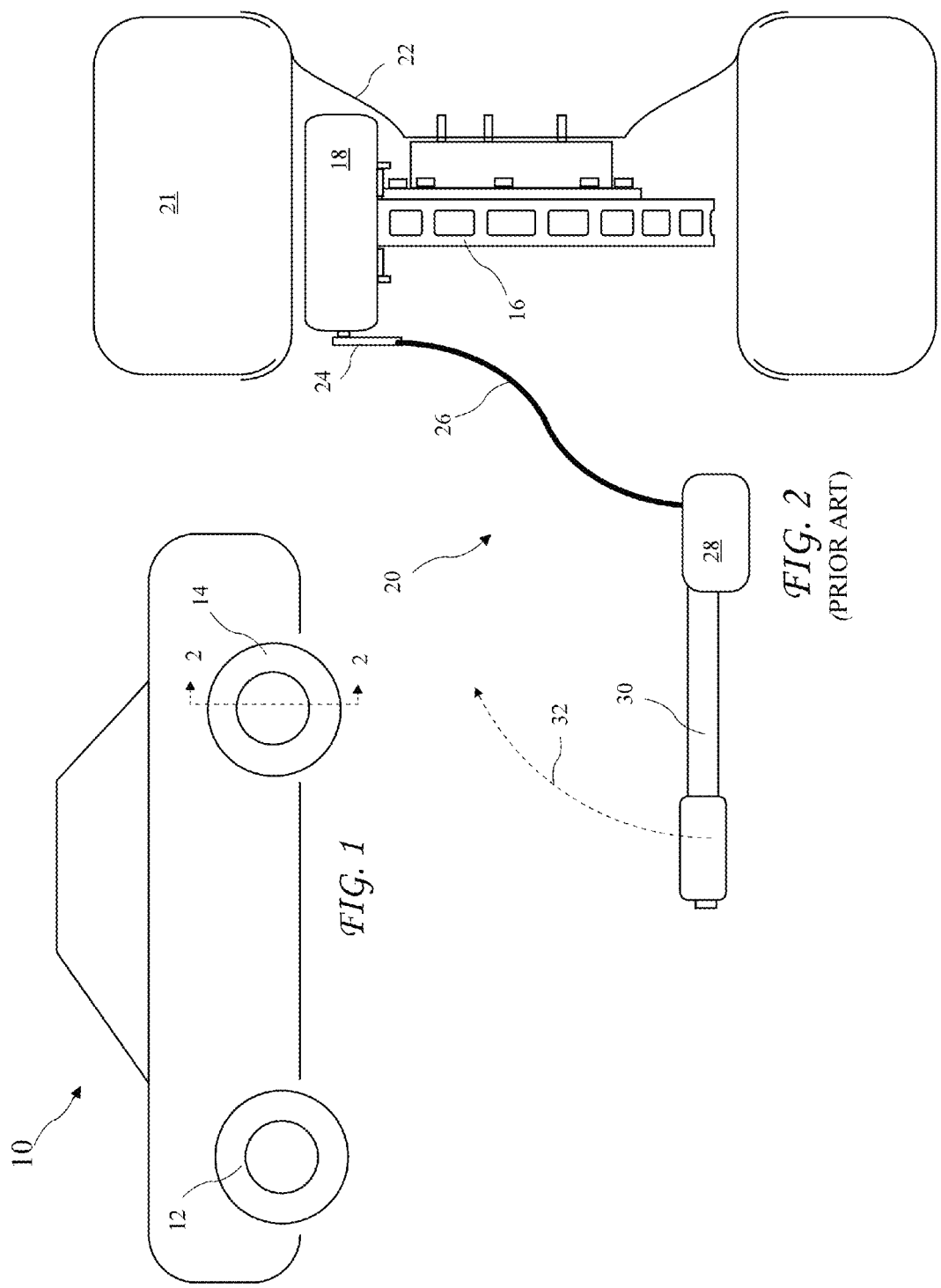

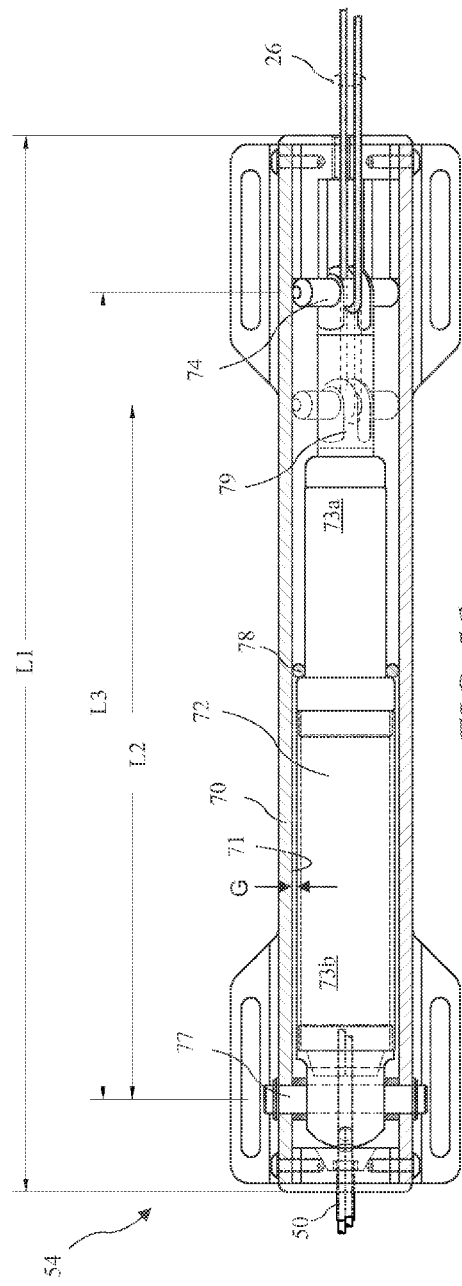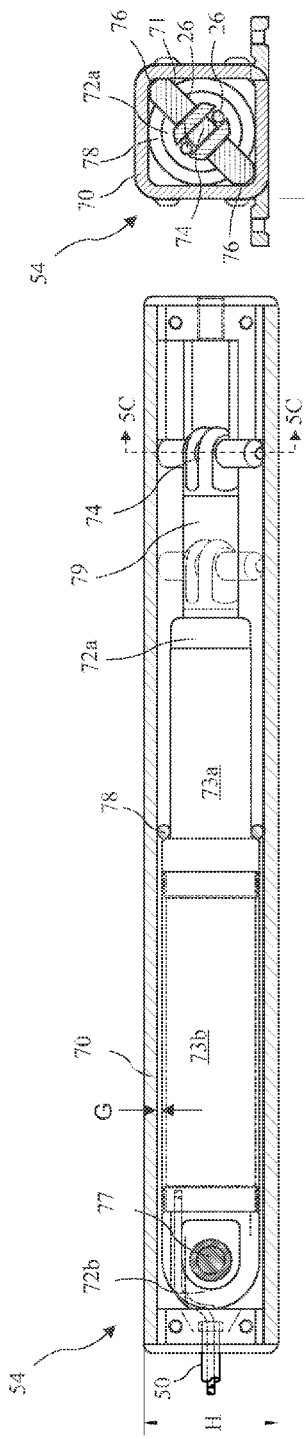

ELECTRONIC PARKING BRAKE ACTUATOR

BACKGROUND OF THE INVENTION

The present application claims the priority of U.S. Provisional Patent Application Ser. No. 61/485,920 filed May 13, 2011, which application is incorporated in its entirety herein by reference.

BACKGROUND OF THE INVENTION

The present invention relates to vehicle parking brakes and in particular to an electronically actuated parking brake for handicapped drivers and custom applications.

Safe and legal motor vehicle operation requires the availability of a parking brake to prevent the vehicle from rolling away when parked on a slope. Generally, parking brakes are applied to rear wheels as either part of the main brake calipers or as small special purpose calipers sharing the same rotor as the main brake calipers, or separate drum type brakes. In each instance, it is common to actuate the parking brakes using a lever or pedal through a cable. Unfortunately, some handicapped drivers can not press a pedal to engage the parking brake. Although electronically actuated parking brake retrofit kits are known, these kits allow the parking brake to be actuated at any time. As a result, the parking brake may be actuated while driving at high speeds causing an accident.

Further, vehicle customizing continues to grow in popularity. In many instances, the customizer prefers to create a simple and sleek appearance. Often, this extends to even the undercarriage of the vehicle. The cables required for parking brake actuation interfere with this goal in some instances and there is a need to minimize the length and/or number of cables running under the car.

Further, many hobbyists work on their cars at home. Their cars are often in varying states of operability, and often can not be moved under their own power. Additionally, many homes have sloped driveways. As a result, a single hobbyist may have great difficulty safely moving an un-operable vehicle, and the vehicle may get away from the hobbyist resulting in damage to the vehicle, nearby structures, and even injury to the hobbyist. Known electrically actuated parking brakes do not address this important problem.

BRIEF SUMMARY OF THE INVENTION

The present invention addresses the above and other needs by providing an electrically actuated parking brake system which includes a control switch in a vehicles cabin, an intelligent controller, a linear actuator, and cables connected between the linear actuator and mechanical parking brakes. The intelligent controller receives signals from the control switch and from one or more electrical devices in the vehicle. If any of the signals from the vehicle indicate that the vehicle is in motion, the parking brakes are not actuated. The electrically actuated parking brake system may further include a remote control, and logic in the intelligent controller will allow the parking brakes to be engaged when the vehicle is in motion, remote control is enabled, and the remote control is actuated by a user. The parking brakes may be either drum brakes or disk brakes.

In accordance with one aspect of the invention, there is provided an electronic parking brake actuator having a remote control. Electronic parking brake actuators are often additions to modified vehicles, for example, hot rods. Such vehicles are often in a non-operating state during building, repair, and modification. When a single worker is required to move the vehicle on a sloped surface, the worker may lose control and injury or damage to the vehicle and/or facility may occur. The remotely controlled electronic parking brake actuator of the present invention allows actuation of the parking brake before damage occurs.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 shows a vehicle having a parking brake.

FIG. 2 shows a prior art manually actuated parking brake system.

FIGS. 5A-5C show a linear actuator for use with the electrically actuated parking brake system according to the present invention.

Corresponding reference characters indicate corresponding components throughout the several views of the drawings.

DETAILED DESCRIPTION OF THE INVENTION

Figure 3:
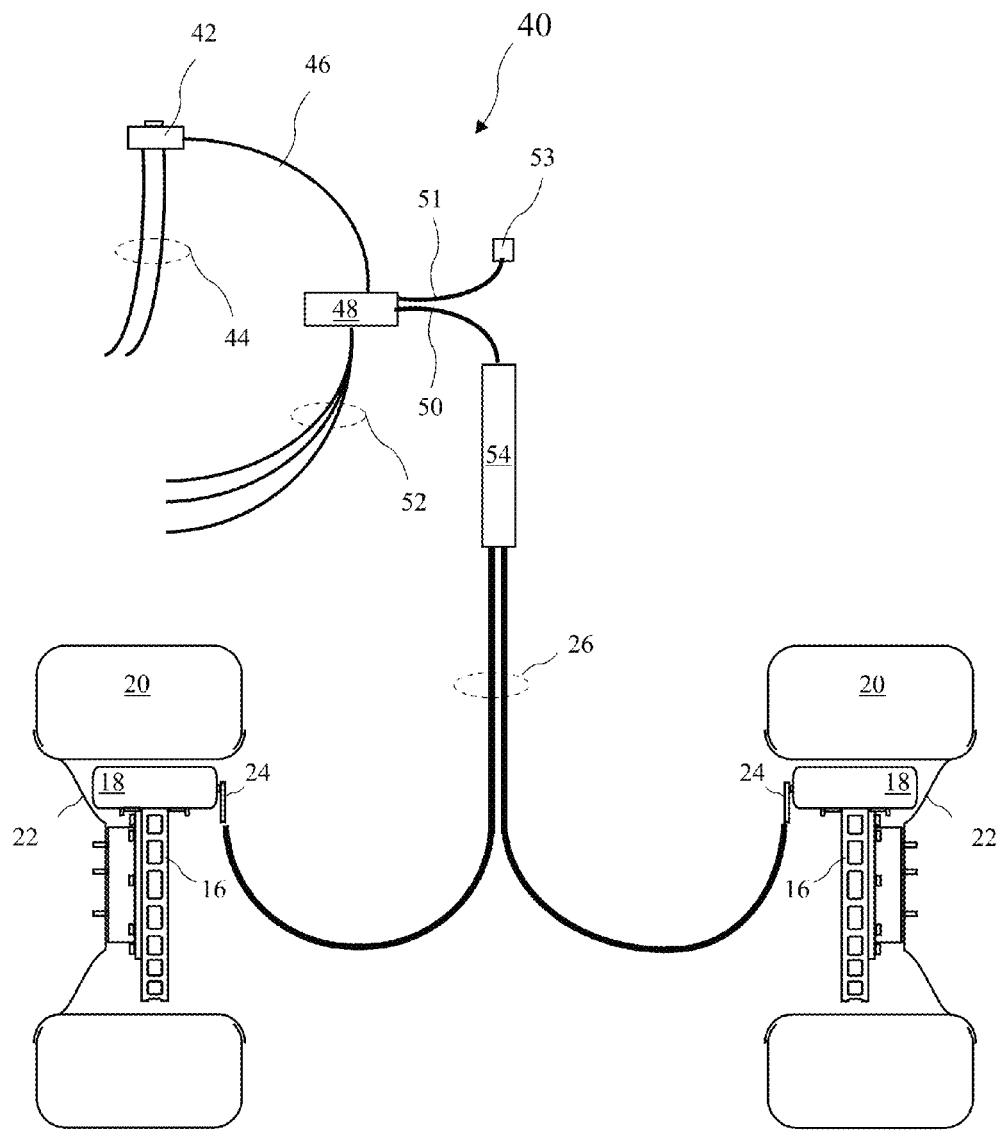
FIG. 3 shows an electrically actuated parking brake system according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

A vehicle 10 having a parking brake for resisting rotation of the front wheels 12 or rear wheels 14.

A prior art manually actuated parking brake system 20 is shown in FIG. 2. The manually actuated parking brake system 20 includes a lever 30 which may be pulled along an arc 32 to pull a cable 26 connected to a lever 24 on a caliper 18. When operated, the caliper 18 squeezes brake pads against a rotor 16 fixed to rotate with a wheel 22 carrying a tire 21. When actuated, the manually actuated parking brake system 20 causes resistance to rotation of the wheel 22 and tire 21, thereby resisting rolling of the vehicle 10. In some instance the lever 30 is replaced by a foot pedal and the caliper 18 and rotor 16 are replaced by a drum brake. In any of these known manually actuated parking brake systems 20, effort is required to actuate the parking brake which may be difficult or impossible for a disabled driver.

An electrically actuated parking brake system 40 according to the present invention is shown in FIG. 3. The electrically actuated parking brake system 40 includes a switch 42 for mounting in the vehicle 10 cabin which receives power through wires 44. The switch 42 is electrically connected to an intelligent controller 48 through wires 46 to provide an ON/OFF signal to the intelligent controller 48. The intelligent controller 48 also receives electrical signals through wires 52 from one or more vehicle devices. The intelligent controller 48 is electrically connected to a linear actuator 54 through wires 50. When the switch 42 is ON, and the signals from the vehicle devices are consistent with the vehicle operator applying the parking brake, the intelligent controller 48 sends a signal to the linear actuator 54. When the linear actuator 54 receives the signal from the intelligent controller 48, the linear actuator 54 mechanically draws the cable 26 thereby applying the parking brake(s).

An indicator 53 is connected to the intelligent controller 48 by wires 51. The indicator 53 provides a visual or audible indication that the electrically actuated parking brake system 40 has been turned ON or OFF, and when the electrically actuated parking brake system 40 completes the transition from OFF to ON or from ON to OFF. For example, the indicator 53 may be a light and the light blinks during the transition from OFF to ON or from ON to OFF. In one embodiment, the light blinks during the transition from OFF to ON and is a solid when the electrically actuated parking brake system 40 is ON, and the light blinks during the transition from ON to OFF and is a solid when the electrically actuated parking brake system 40 is OFF. The light may be a single color, or may be two colors, for example, may be red during actuation and green during deactivation.

The intelligent controller 48 may be integrated into a switch housing of the switch 42 and not be a separate device. The signals received from vehicle devices may be: vehicle speed, a throttle position (gas pedal) signal, an engine on signal, a transmission not in park signal, an accessories on signal, or one or more electrical signal from any electrical device of the vehicle 10. For example, the parking brake may be inhibited when the vehicle speed is not zero.

Further, in some instance such as parking on a slope, the parking brakes alone may not hold the vehicle. The intelligent controller 48 may continue to monitor vehicle speed after turning ON. If a non-zero vehicle speed is sensed, an alarm may be issued to warn that the vehicle is moving. The alarm may be a visual alarm or an audio alarm or both. For example, a vehicle horn may be sounded. Additionally, intelligent controller 48 may send an electronic signal to a wireless monitor if the vehicle speed is not zero after the parking brake is fully actuated.

Figure 4:
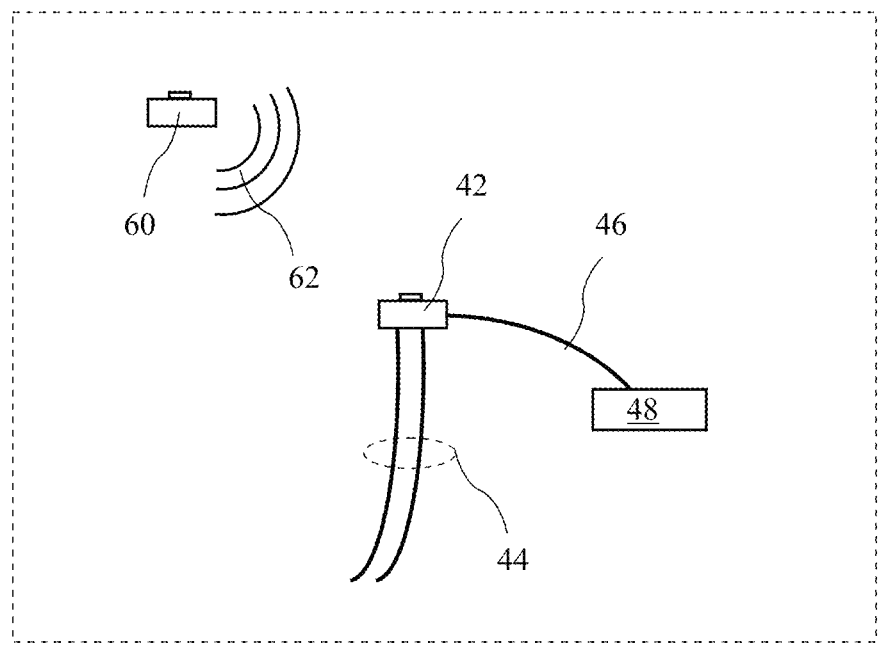
FIG. 4 shows an electrically actuated parking brake system having a remote control according to the present invention.

An electrically actuated parking brake system 40 having a remote control 60 according to the present invention is shown in FIG. 4. The remote control 60 provides a parking brake on signal allowing an individual physically moving a vehicle, for example on a sloped surface, to actuate and de-actuate the parking brake without entering the vehicle. The intelligent controller 48 preferably includes a remote control lockout to prevent a random signal for actuating the parking brake(s).

An example of a linear actuator 54 for use with the electrically actuated parking brake system according to the present invention is shown in FIGS. 5A-5C. The linear actuator housing 70 has:
an overall length L1 of preferably about 381 mm;
a minimum actuator extension L2 of about 250 mm;
a maximum actuator extension L3 of about 291 mm;
a housing height H of about 48 mm; and
a housing width W of about 48 mm.

A linear actuator 54 includes a housing 70 and a linear motor 72. The cable 26 is connected to the linear motor 72 and is drawn into the housing 70 by the linear motor 72 to actuate the parking brakes. Preferably, the cable 26 wraps around a clevis 74 and is free to self adjust to equalize the tension on each end of the cable 26 when the parking brake is applied. The housing 70 further includes a non-round interior cross-section, and the clevis 74 includes guides 76 which cooperate with the non-round interior 71 cross-section to prevent the clevis 74 from rotating during actuation.

The linear motor 72 includes a sliding shaft 79 extending from a first end 72a end of the linear motor 72, the cable 26 attached to an end of the sliding shaft 79 opposite the linear motor 72. A second end 72b of the linear motor 72 opposite the first end 72a is connected to the housing 70 by a round pin 77 and the linear motor 72 is separated from an interior 80 of the housing 70 by a gap G provided by a spacer 78. The linear motor 72 includes a smaller diameter first body portion 73a proximal to the first end 72a and a larger diameter second body portion 73b proximal to the second end 72b, and the spacer 78 resides over the first body portion 73a and against an end of the second body portion 73b. The bushings 76 slide diagonally in the non-round interior 71 of the housing 70 to prevent the sliding shaft 79 from rotating during operation, and thus to prevent the clevis 74 from rotating during actuation. The non-round interior 71 preferably has a generally rectangular cross-section with rounded corners, and preferably a generally square cross-section with rounded corners.

Figure 6:
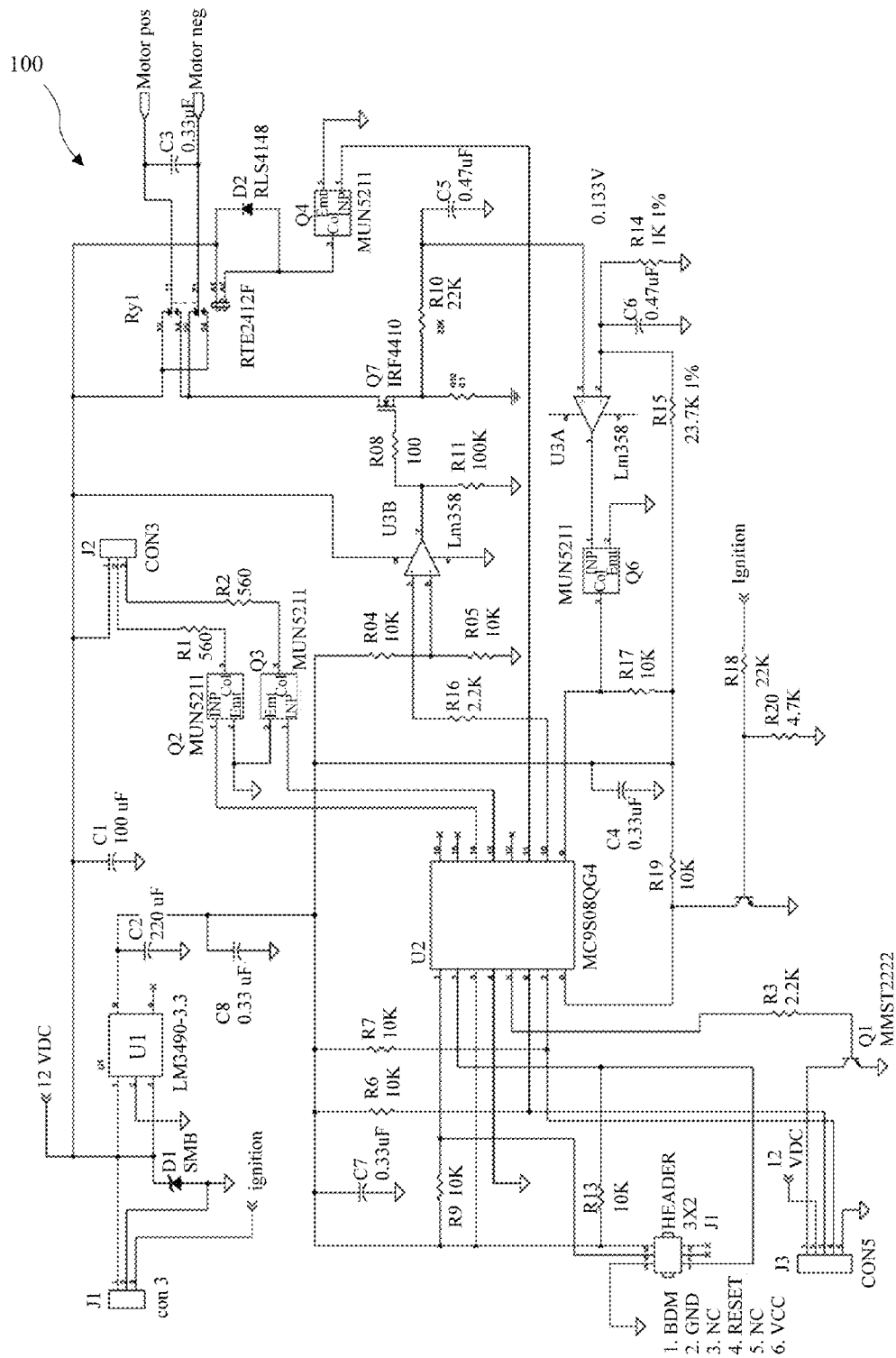
FIG. 6 is a preferred circuit according to the present invention.
Figures 7, 8:
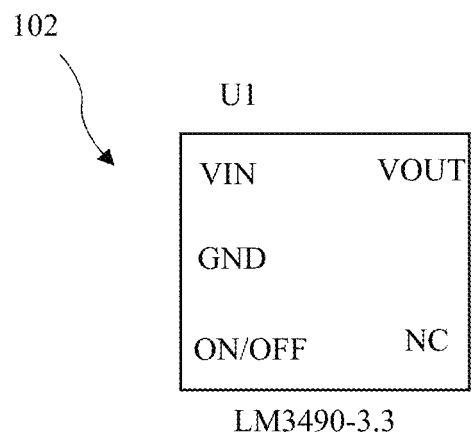
FIG. 7 is a first element of the preferred circuit according to the present invention.
FIG. 8 is a second element of the preferred circuit according to the present invention.

A preferred circuit 100 for the present invention is shown in FIG. 6, a first element 102 of the preferred circuit is shown in FIG. 7, and a second element 104 of the preferred circuit 100 is shown in FIG. 8.

While the invention herein disclosed has been described by means of specific embodiments and applications thereof, numerous modifications and variations could be made thereto by those skilled in the art without departing from the scope of the invention set forth in the claims.

I claim:

1. An electrically actuated parking brake system comprising:
 a switch;
 an intelligent controller electrically connected to the switch;
 electrical connections between at least one vehicle device of the vehicle and the intelligent controller, the intelligent controller receiving at least one signal from the at least one vehicle device indicating whether the parking brake should be actuated;
 a linear actuator electrically connected to the intelligent controller the linear actuator comprising:
  a housing;
  a linear motor residing in the housing;
  a body of the linear motor spaced away from interior walls of the housing by a gap (G); and
  a sliding shaft extending from a first end of the linear motor;
 a cable connecting the sliding shaft of the linear motor to a vehicle parking brake;
  a second end of the linear motor opposite to the first end, the second end connected to the housing by a pin extending through the linear motor and into opposite sides of the housing; and
  opposing guides attached to the sliding shaft, the guides cooperating with a non-round interior of the housing to prevent the sliding shaft from rotating.

2. The parking brake system of claim 1, wherein the intelligent controller receives a vehicle speed and does not actuate the parking brakes if the vehicle speed is not zero.

3. The parking brake system of claim 2, wherein the intelligent controller monitors the vehicle speed after the parking brake is fully actuated and provides an audio alarm if the vehicle speed is not zero after the parking brake is fully actuated.

4. The parking brake system of claim 3, wherein the intelligent controller monitors the vehicle speed after the parking brake is fully actuated and sounds a vehicle horn if the vehicle speed is not zero after the parking brake is fully actuated.

5. The parking brake system of claim 2, wherein the intelligent controller monitors the vehicle speed after the parking brake is fully actuated and sends an electronic signal to a wireless monitor if the vehicle speed is not zero after the parking brake is fully actuated.

6. The parking brake system of claim 1, wherein the intelligent controller receives a throttle position and does not actuate the parking brakes if the throttle position is not zero.

7. The parking brake system of claim 1, wherein an indicator is connected to the intelligent controller and provides a visual signal indicating parking brake status.

8. The parking brake system of claim 7, wherein the indicator blinks during the transition from OFF to ON or from ON to OFF.

9. The parking brake system of claim 8, wherein the indicator blinks with a red color during a transition from OFF to ON and with a green color during a transition from ON to OFF.

10. The parking brake system of claim 9, wherein the indicator is a solid red color upon completion of the transition from OFF to ON and is a solid green color upon completion of the transition from ON to OFF.

11. The parking brake system of claim 1, wherein the cable has a first end connected to a first parking brake and a second end connected to a second parking brake.

12. The parking brake system of claim 11, wherein the cable is connected to a clevis in the linear actuator and tension is applied equally to both ends of the cable.

13. The parking brake system of claim 12, wherein:
the linear actuator includes a housing having a non-round interior cross-section; and
the clevis includes guides cooperating with the non-round interior cross-section to prevent the clevis from rotating.

14. The parking brake system of claim 1, further including a remote control wirelessly cooperating with the intelligent controller to engage and disengage the parking brake.

15. The parking brake system of claim 1, wherein the interior of the housing has a generally square cross-section and the opposing guides reside diagonally reaching into opposite corners of the generally square cross-section to prevent the sliding shaft from rotating.

16. The parking brake system of claim 1, wherein a spacer resides between the linear motor and the housing to maintain the gap (G) between the linear motor and the interior walls of the housing.

17. An electrically actuated parking brake system comprising:
a switch;
an intelligent controller electrically connected to the switch;
electrical connections between at least one vehicle device of the vehicle and the intelligent controller, the intelligent controller receiving vehicle speed and not allowing activation of parking brakes if the vehicle speed is not zero;
an indicator light connected to the intelligent controller, the indicator light blinking with a red color during a transition from OFF to ON and with a green color during a transition from ON to OFF, and the indicator a solid red color upon completion of the transition from OFF to ON and a solid green color upon completion of the transition from ON to OFF;
a linear actuator electrically connected to the intelligent controller and controlled by the intelligent controller, the linear actuator comprising:
a housing;
a linear motor residing in the housing;
a body of the linear motor spaced away from interior walls of the housing by a gap (G), the interior walls of the housing including a generally square cross-section; and
a sliding shaft extending from a first end of the linear motor;
a second end of the linear motor opposite to the first end, the second end of the linear motor connected to the housing by a pin extending through the linear motor and into opposite sides of the housing; and
opposing guides attached to the sliding shaft and residing diagonally reaching into opposite corners of the interior walls to prevent the sliding shaft from rotating; and
a cable connected between the sliding shaft in the linear actuator and the parking brakes.

18. An electrically actuated parking brake system comprising:
a switch;
an intelligent controller electrically connected to the switch;
electrical connections between at least one vehicle device of the vehicle and the intelligent controller, the intelligent controller receiving at least one signal from the at least one vehicle device indicating whether the parking brake should be actuated;
a remote control wirelessly cooperating with the intelligent controller to engage and disengage the parking brake;
a linear actuator electrically connected to the intelligent controller, the linear actuator comprising:
a housing;
a linear motor residing in the housing;
a body of the linear motor spaced away from interior walls of the housing by a gap;
a sliding shaft extending from a first end of the linear motor; and
a second end of the linear motor opposite to the first end, the second end of the linear motor connected to the housing by a pin extending through the linear motor and into opposite sides of the housing;
opposing guides attached to the sliding shaft, the guides cooperating with a non-round interior of the housing to prevent the sliding shaft from rotating; and
a cable connecting the sliding shaft to a vehicle parking brake.

* * * * *